United States Patent [19]

Carriay et al.

[11] 4,223,732
[45] Sep. 23, 1980

[54] MICROEMULSIONS FOR USE AS SPACES IN WELL CEMENTATION

[75] Inventors: Jean Carriay, Le Fauga; Jacques de Lautrec, St-Gaudens, both of France

[73] Assignee: Societe National Elf Aquitaine (Production), Courbevoie, France

[21] Appl. No.: 940,302

[22] Filed: Sep. 7, 1978

[30] Foreign Application Priority Data

Jul. 8, 1977 [FR] France .............................. 77 21094

[51] Int. Cl.$^2$ ............................................ E21B 33/16
[52] U.S. Cl. .................................................. 166/291
[58] Field of Search ...................... 166/285, 291, 293

[56] References Cited

U.S. PATENT DOCUMENTS

| | | | |
|---|---|---|---|
| 2,796,131 | 6/1957 | Hinchliffe et al. | 166/293 X |
| 3,175,611 | 3/1965 | Hower | 166/293 X |
| 3,625,286 | 12/1971 | Parker | 166/291 |
| 3,799,874 | 3/1974 | Parker | 166/291 X |
| 3,849,316 | 11/1974 | Motley et al. | 166/291 X |
| 3,850,248 | 11/1974 | Carney | 166/291 |
| 4,108,779 | 8/1978 | Carney | 166/291 X |
| 4,141,843 | 2/1979 | Watson | 166/291 X |

*Primary Examiner*—Stephen J. Novosad
*Assistant Examiner*—George A. Suchfield
*Attorney, Agent, or Firm*—Burgess, Ryan and Wayne

[57] ABSTRACT

New application of microemulsions as buffers between the slurry and the cement in the cementation of oil wells. The microemulsions contain an amphoteric surfactant selected from the group of alkyl dimethyl betaines.

7 Claims, No Drawings

MICROEMULSIONS FOR USE AS SPACES IN WELL CEMENTATION

The present invention relates to the improvement in the quality of cementation of a column in a drilled oil well, when an oil-base slurry is used in the course of the drilling.

In the drilling of an oil well, a slurry is used which, in certain cases, can be an oil-base slurry, which includes emulsions with an aqueous dispersed phase and an oily continuous phase.

When the drilling has reached a suitable level, a column of screwed tubes is dropped and positioned in the well; the well is, of course, filled with slurry. The next operation consists in pumping a grout of cement through the tubes, which are generally filled with slurry, and in discharging the cement grout into the annular space between the column and the walls of the well, and allowing this grout to harden in order to cement this column of tubes to the adjoining ground.

What is sought for in such a cementation is, on the one hand a seal between the various formations in the ground passed through, and on the other hand, anchorage of the tubes. It is important, among other things, that the ring of cement adhere firmly to the walls of the well and to the column of tubes.

If an oil-base slurry is used, the cementation has to take place in the presence of this slurry. Two problems arise which are linked to the presence of the oil-base slurry. The cement grout and the slurry can mix, forming a magma that is difficult to displace with the techniques applied, and the oil slurry has impregnated and covered the sides of the well which prevents the cement from adhering properly.

These two problems can be solved by the use of a buffer of fluid placed between the slurry and the cement. This buffer is known in the oil industry as a "spacer", (and) must have, in order to serve its function as a buffer, (a) a viscosity and density sufficient to keep the slurry and cement from coming in contact with each other and (b) characteristics that it will eliminate the oil film deposited on the sides of the hole by the slurry.

This invention makes it possible to embody these two conditions by the use of microemulsions and the application of a predetermined volume of these microemulsions as "spacers".

The present invention is directed to a water-oil microemulsion for use as a spacer in oil well cementation which comprises

|     | | |
| --- | --- | --- |
|     | an amphoteric surfactant | 10 to 20% by weight |
|     | one or more co-surfactants | 10 to 15% by weight |
|     | a mixture of hydrocarbons | 3 to 45% by weight |
| and | water of variable salinity | 30 to 80% by weight |

The function of the microemulsion is to reverse the wettability of the walls of the hole by eliminating the oil film and making the grounds wettable with water in order to permit the cement, whose continuous phase is water, to adhere strongly to the formations.

The amphoteric surfactant is selected from the group of betaines, and in particular the alkyl dimethyl betaines. One or more cosurfactants selected from the group of short-chain aliphatic alcohols with 1 to 10 carbon atoms, and/or glycols such as a monobutyl ether of ethylene glycol (B.E.G.) are used with the amphoteric surfactant.

The hydrocarbon or mixture of hydrocarbons can be selected from the group of crude oil, fuel-oil, gas-oil, and more or less refined fractions of crude oil.

By way of exemplification through non-limiting examples, there follows three compositions of microemulsions that can be used as "spacers".

The betaine selected in the examples is acetyl dimethyl dodecyl ammonium chloride in the form of a sodium salt, sold under the name of AMPHOSOL DMC/MCA 35.

EXAMPLE 1

We mix, by successive addition and agitation

| | |
| --- | --- |
| AMPHOSOL DMC/MCA 35 | 16.6% by weight |
| B.E.G. | 14% by weight |
| Gas-Oil | 4.7% by weight |
| Salt water saturated with NaCl | 64.6% by weight |

EXAMPLE II

| | |
| --- | --- |
| AMPHOSOL DMC/MCA 35 | 15.4% by weight |
| B.E.G. | 14% by weight |
| Gas-Oil | 15% by weight |
| Salt water with 20g NaCl/l | 55.6% by weight |

The percentages of AMPHOSOL refer to the active ingredient of the product which, in the delivered state, contain 35% active ingredient.

These microemulsions have the following characteristics:

| | |
| --- | --- |
| density | 0.98 to 1.10 |
| apparent viscosity | 17 to 20 cp. |
| plastic viscosity | 17 to 20 cp. |
| stability in water containing salt and calcium chloride | |
| stability at temperatures ranging up to 100° C. | |

The method of application of the microemulsions according to the invention, as spacers, consists in injecting the microemulsion into the tubes before the cement grout. The necessary volume should be such that the height of the annular space occupied by the spacer will be at least about 100 meters. Thus, in the annular space, the cement grout pushes in front of itself a plug of microemulsion which prepares the surfaces to be cemented.

The efficiency of the application of the microemulsions according to the invention, as spacers, is determined by the extent of the cement-to-ground adhesion. Tests made in the laboratory to determine the efficiency of the microemulsions were conducted as follows:

(1) on a sample of earth, of cylindrical shape (diameter 33 mm, height 23 mm), we filtered an oil-base slurry at a differential pressure of 10 kg/cm$^2$ for 150 minutes, with agitation at a temperature of 25 to 30° C.

(2) the slurry is replaced by the microemulsions; the filtration lasts 20 min. under the same conditions.

(3) the microemulsion is replaced by a cement grout; the filtration lasts 30 min. under the same conditions.

(4) the sample of earth is placed in a cylindrical mold of 33 mm inner diameter and the face exposed during the filtrations is cemented.

(5) after 7 days of hardening of the cement under water, at 25–30° C., atmospheric pressure, we unmold and measure the force necessary to break, by shearing, the bond between earth and cement.

This force, reduced to the unit of surface, measures the adhesion of the cement to the earth. It is in the order of:

- 3 kgf/cm$^2$ when the cement is directly bonded to the earth
- 1 kgf/cm$^2$ when an oil-base slurry has circulated before the cement grout
- 3 kg/cm$^2$ when after an oil slurry, one of the microemulsions has circulated before the cement grout.

As will be noted, this type of microemulsion makes it possible to obtain very good adhesion between a cement grout and a wide variety of earth samples which have undergone the passage of an oil slurry.

The invention is not limited to microemulsions with amphoteric surfactants.

Various mixtures of surfactants can be used as a function of the specificity of the slurry, the cement or the earth.

What is claimed is:

1. A method for the cementation of oil wells which have been drilled with the use of an oil base slurry which comprises:
    (1) positioning a well casing in the well;
    (2) injecting a microemulsion comprising by weight
        (a) 10–20% of an amphoteric surfactant
        (b) 10–15% of at least one co-surfactant
        (c) 3–45% of a hydrocarbon oil or mixture of hydrocarbon oils, and
        (d) 30–80% of water to a height of at least about 100 meters in the annular space between the well casing and the side of the well, ahead of a cement grout intended for cementation of the well.

2. The method of claim 1 wherein the amphoteric surfactant is a betaine amphoteric surfactant.

3. The method of claim 2 wherein said surfactant is an alkyl dimethyl betaine surfactant.

4. The method of claim 1, wherein the amphoteric surfactant is acetyl dodecyl ammonium chloride in the form of the sodium salt.

5. The method of claim 1, wherein the cosurfactants are short-chain aliphatic alcohols containing 1 to 10 carbon atoms.

6. The method of claim 1, wherein the cosurfactant is a glycol.

7. The method of claim 1, wherein the glycol is the monobutyl ether of ethylene glycol.

* * * * *

UNITED STATES PATENT OFFICE
CERTIFICATE OF CORRECTION

Patent No. 4,223,732                     Dated    Sept. 23, 1980

Inventor(s)    Jean Carriay, et al

It is certified that error appears in the above-identified patent and that said Letters Patent are hereby corrected as shown below:

In the Title, on title page and at top of column 1: "SPACES" should be --SPACERS--.

Signed and Sealed this

Twenty-fourth Day of March 1981

[SEAL]

Attest:

RENE D. TEGTMEYER

Attesting Officer          Acting Commissioner of Patents and Tradema